(No Model.)

J. A. HARD.
NUT LOCK.

No. 384,204. Patented June 5, 1888.

Witnesses,
Harry S. Rohrer
Tom R. Stuart

Inventor.
Josiah A. Hard.
By Parker & Sweet
Attorney

N. PETERS, Photo-Lithographer, Washington, D. C.

UNITED STATES PATENT OFFICE.

JOSIAH A. HARD, OF DENVER, COLORADO, ASSIGNOR OF ONE-HALF TO HENRY L. PRENTICE, OF SAME PLACE.

NUT-LOCK.

SPECIFICATION forming part of Letters Patent No. 384,204, dated June 5, 1888.

Application filed August 27, 1887. Serial No. 247,992. (No model.)

*To all whom it may concern:*

Be it known that I, JOSIAH A. HARD, a citizen of the United States, residing at Denver, in the county of Arapahoe and State of Colorado, have invented certain new and useful Improvements in Nut-Locks; and I do hereby declare the following to be a full, clear, and exact description of the invention, such as will enable others skilled in the art to which it appertains to make and use the same.

My invention relates to improvements in that class of nut-locks wherein the nut is held in position upon the bolt by means of radially-arranged spurs or projections upon an interposed plate engaging with the sides of the nut, the object of my present invention being to provide a nut-lock which shall be simple in its construction, reliable and efficient in operation, and which can be produced at the minimum of cost.

To these ends my improvements consist, essentially, of the novel details of construction and general arrangement of parts, as will be hereinafter fully described, and pointed out in the claim.

In order that my invention may be fully understood, I will proceed to describe it with reference to the accompanying drawings, in which—

Figure 1:
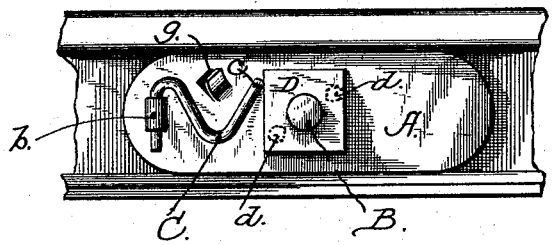
Figure 2:

Figure 1 represents a front elevation of my improved device, and Fig. 2 a detail view of the spring for holding the nut in position.

Similar letters of reference indicate like parts in the several figures of the drawings.

In the said drawings, A designates an elongated metallic plate provided with a suitable opening for the reception of the bolt B, while upon one side of the said opening for the bolt is provided a lug, *b*, having a vertical opening for the reception of the outer end of the spring-arm C, as shown.

As will be seen, the spring-arm C is secured to the plate A at such distance from the opening *a* as to just permit the corner of the nut D to pass the free end *c* of the spring-arm as it is being screwed into position upon the bolt. After the corner of the nut has passed the end of the spring-arm the latter will impinge closely upon the side of the nut to prevent any tendency of the same to unscrew. The spring-arms are of a V shape, and preferably formed of stout steel wire, the one end, *c*, of which is bent back upon itself to form a wide bearing to contact with the side of the nut, while the opposite end projects through the opening of the lug *b*, as shown.

By means of this construction the nut may be readily screwed in place upon the bolt and securely held thereon, the free end of the spring-arm engaging with one of the sides of the nut to keep it in the desired position. To release the nut, it is only necessary to draw back the end of the spring-arm and engage it back of the projection *g* (shown in Fig. 1) during the operation of unscrewing the nut. In case of breakage of the spring-arms through continued use, new ones can be readily substituted without requiring the employment of a new plate, as is commonly the case with all other similar devices.

Suitable projecting spurs, *d*, are provided upon the plate A to project into the oval opening of the ordinary fish-plate to prevent the plate A from turning when in use.

Having thus described my invention, I claim as new and desire to secure by Letters Patent—

A nut-lock composed of the metallic plate A, having projections *b* and *g* formed integral therewith, and provided with the V-shaped spring-arm C, having outer looped end, *c*, substantially as and for the purpose specified.

In testimony whereof I affix my signature in presence of two witnesses.

JOSIAH A. HARD. [L. S.]

Witnesses:
E. E. STOCKWELL,
SAMPSON WARE.